United States Patent
Bächle

(10) Patent No.: US 6,757,600 B2
(45) Date of Patent: Jun. 29, 2004

(54) CONTROL DEVICE FOR A NETWORKABLE DEVICE

(75) Inventor: Dieter Bächle, Weil im Schönbuch (DE)

(73) Assignee: J. Eberspächer GmbH & Co., Esslingen (DE)

( * ) Notice: Subject to any disclaimer, the term of this patent is extended or adjusted under 35 U.S.C. 154(b) by 0 days.

(21) Appl. No.: 10/080,483

(22) Filed: Feb. 21, 2002

(65) Prior Publication Data

US 2002/0156560 A1 Oct. 24, 2002

(30) Foreign Application Priority Data

Feb. 21, 2001 (DE) .......................................... 101 08 392

(51) Int. Cl.⁷ .............................................. G06F 17/00
(52) U.S. Cl. .............................. 701/36; 701/29; 701/32; 701/33; 701/35
(58) Field of Search .............................. 701/36, 29, 32, 701/33, 35

(56) References Cited

U.S. PATENT DOCUMENTS

| | | | | |
|---|---|---|---|---|
| 5,034,889 A | * | 7/1991 | Abe ............................ | 701/35 |
| 5,440,449 A | * | 8/1995 | Scheer ........................ | 361/686 |
| 5,459,660 A | | 10/1995 | Berra | |
| 5,555,498 A | * | 9/1996 | Berra et al. ................... | 701/33 |
| 5,646,865 A | * | 7/1997 | Alfaro et al. .................. | 701/29 |
| 5,737,711 A | * | 4/1998 | Abe ............................. | 701/29 |
| 5,796,332 A | * | 8/1998 | Steiert ......................... | 340/438 |
| 5,922,037 A | * | 7/1999 | Potts ........................... | 701/29 |
| 6,021,366 A | * | 2/2000 | Fieramosca et al. .......... | 701/33 |
| 6,112,152 A | | 8/2000 | Tuttle | |
| 6,169,943 B1 | * | 1/2001 | Simon et al. ................. | 701/29 |
| 6,360,145 B1 | * | 3/2002 | Robinson ..................... | 701/35 |
| 6,362,730 B2 | * | 3/2002 | Razavi et al. ................ | 340/438 |
| 6,370,449 B1 | * | 4/2002 | Razavi et al. ................. | 701/1 |
| 6,407,554 B1 | * | 6/2002 | Godau et al. ................ | 324/503 |

FOREIGN PATENT DOCUMENTS

GB  2295250 A  * 5/1996  .......... G01M/15/00

* cited by examiner

Primary Examiner—William A. Cuchlinski, Jr.
Assistant Examiner—Eric M Gibson

(57) ABSTRACT

A control device for a device that can be networked, in particular for a water or air heating device, operated with liquid fuel, of a motor vehicle, in the form of a supplementary heater or an auxiliary heater. The control device has a client-specific data interface by which the control device can be connected to a client-specific data network, in particular to a data bus in a motor vehicle. In order to reduce the expense on the maker's part for programming, testing, and diagnosis for different client-specific data interfaces, the control device has an additional, maker-specific data interface constituted as a bidirectional wireless connection, of which the control device can be connected to a maker-specific data processing device for respective programming, testing or diagnosis.

8 Claims, 1 Drawing Sheet

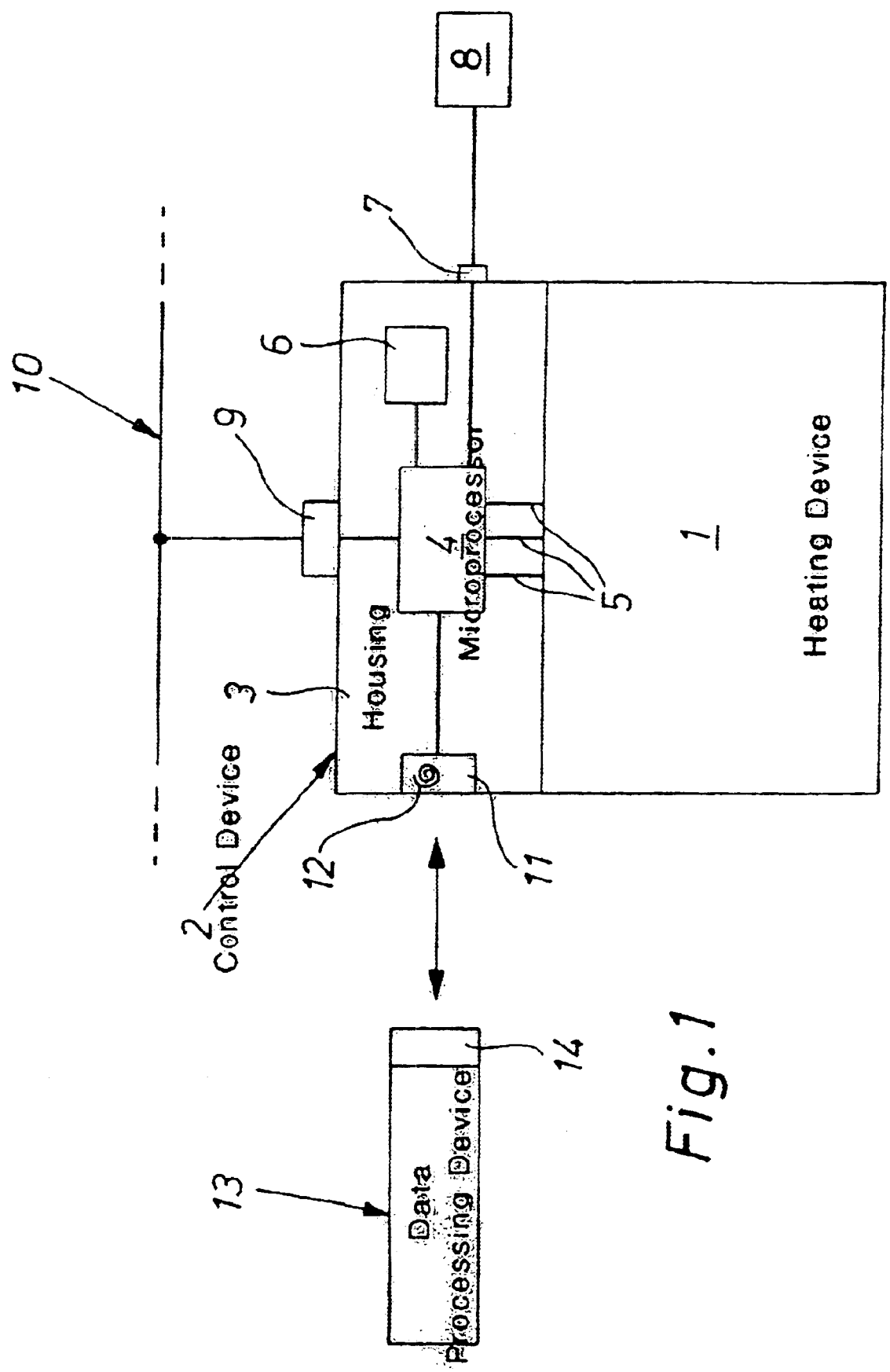

CONTROL DEVICE FOR A NETWORKABLE DEVICE

BACKGROUND OF THE INVENTION

The present invention relates to a control device for a device which can be connected in a network, e.g. heating device, in particular for a water or air heating device, operated with liquid fuel, of a motor vehicle, in the form of a supplementary heater or an auxiliary heater.

TECHNICAL FIELD

In modern motor vehicles, the control device of a device built into the vehicle, e.g., heating device, telecommunication device, audio device, or air conditioning device, is connected into the vehicle electronics, i.e., the respective device is "networked". For this purpose, the control device is connected to a vehicle data network, which for example has a data bus, in particular a CAN (Controller Area Network) bus. In this manner, the control device, and therewith the respective device, can be actuated by means of a service unit in the vehicle. It is likewise possible to monitor the correct functioning of the device by means of the vehicle data network. It can furthermore be provided to connect a diagnostic device to the vehicle data network, within the scope of servicing or inspection, in order to diagnose the functioning of the device connected thereto, particularly also that of a heating device.

In the present application, a distinction is made between a "client" and a "maker". As "client" is understood here to be a user of the respective device, who builds the respective device into a complex system, e.g. a vehicle, and networks it therein. A client is usually a vehicle producer who builds the respective device into his vehicles. By "maker" is understood here the producer of the respective device, e.g., the heating device, who delivers his device to different clients.

The devices, e.g., heating devices, are usually specially produced by the maker according to the client's wishes, or are adapted to the client's wishes. In order to be able to link the device or its control device into a client-specific data network, a control device of the kind mentioned at the beginning has a client-specific data interface, which is especially adapted to the client-specific data network. For example, the client-specific data network demands a certain hardware, particularly a plug connection with predetermined number and arrangement of individual pin connections. Furthermore, respectively predetermined voltages or potentials are to be observed for the individual pin connections here in order to make linking to the client-specific data network possible. Moreover, the client-specific data network also prescribes the respective software, e.g. a given data format, so that communication over the data network can take place with the control device.

This data interface present at the control device is usually used by the maker of the respective device or of the associated service unit in order to program the control device. Likewise, testing and diagnosis of the control device, or of the associated device, can be carried out over this data interface. So that the device maker can use the client-specific data interface, the maker's whole periphery which is required for programming, testing and diagnosis has to be respectively matched to the client-specific data interface. Since the data networks of different clients fundamentally differ from each other, and also differently configured data networks are possible for individual clients, there arise a great number of different data interfaces which are not compatible, to which the device maker has to permanently match his peripheral devices. The expense required for this is enormous.

SUMMARY OF THE INVENTION

The present invention has as its object to provide, for a control device of the kind mentioned at the beginning, an embodiment that reduces the maker's cost for the programming and/or testing and/or diagnosis of the control devices or of the associated devices, for different client-specific data networks.

This object is attained according to the invention by a control device for a networkable device operated with liquid fuel, of a motor vehicle, comprising a supplementary heater or an auxiliary heater, comprising a client-specific data interface by means of which the control device can be connected to a client-specific data network in a motor vehicle. The control device comprises a maker-specific data interface comprising a bi-directional wireless connection, by which the control device can be connected to a maker-specific data processing device for at least one of programming, testing and diagnosis.

The invention is based on the general concept of carrying out the programming and/or testing and/or diagnosis of the control devices or of the associated devices by means of an additional, separate, maker-specific data interface which is arranged as a bidirectionally operating wireless connection. This maker-specific data interface can be configured by the maker according to his own requirements, independent of the respective clients, and thus independent of the data client-specific interface constituted at the control device. In particular, it is thus possible to arrange the maker-specific data interface identically for several control devices which respectively have other, client-specifically configured data interfaces. The maker can then communicate with a maker-specific data processing device, e.g. peripheral devices for programming and/or testing and/or diagnosis of the control device or of the associated device, by means of the same kind of maker-specific data interfaces with these different control devices; no, or only a relatively small, expense being required in order to adapt the maker-specific data processing device to the respective control device configuration. The maker-specific data interface can be standardized by the maker to this extent.

With the control device according to the invention, conflicts can be avoided which can arise when on the one hand a client-specific data network, and on the other hand a maker-specific data processing device, communicate with the control device by means of a common (client-specific) data interface.

The maker-specific data processing device, which can be connected to the control device by means of the maker-specific data interface, can be standardized by the maker. In particular the cost is reduced, or is dispensed with, which is required for adaptation to a client-specifically configured control device in the testing and programming software and hardware in development, in quality assurance, in manufacture and in customer service. As a rule, only very slight adaptations of the testing and programming software are required, for example in the EEPROM address region.

The additional, separate, maker-specific data interface according to the invention is constituted as a bidirectional wireless connection. A bidirectional wireless connection is for example known from DE 195 15 353 C2, and serves there for the production of a circuit connection between a service unit arranged in a vehicle interior and a control device arranged on a heating device, the heating device with its control device being arranged in the region of the vehicle floor. Furthermore a wireless remote operation of a heating device is known from the German Patent Application 100 06 395.0 of Feb. 12, 2000. However, a data interface, with which the control device can be connected to a client-specific data interface or to a maker-specific data processing device, basically differs from a circuit connection between the control device and an associated service unit, independently of whether this circuit connection is implemented by means of wires or without wires.

By means of the maker-specific interface constituted according to the invention as a bidirectional wireless connection, it is possible to program and to test the device or the associated control device with minimum cost, since no casing elements, or even the control device itself, have to be dismantled. Expensive, specially arranged adapters, which the customer service personnel had to install for diagnosis, can be likewise dispensed with.

While with a conventionally constituted data interface a corresponding plug or connector had to be accessible on the respective device in the respective mounting situation, this is dispensed with when using the data interface arranged as a bidirectional wireless connection according to the invention.

In an embodiment, data specific to the equipment, e.g., device recognition, manufacturing state of the device, can be interrogated and/or input and/or changed by means of the maker-specific data interface. In particular, it is thus possible to check, e.g. for its serial number, a device which is already packed for dispatch. Furthermore, for example, a delivery card can be supplemented or replaced, the corresponding data being placed in the control device.

The data which can be transmitted over the maker-specific data interface for communication with the control device can appropriately have a maker-specific data format which differs from a client-specific data format, which is the format of the data which can be transmitted over the client-specific data interface for communication with the control device. It is possible in this manner to use on the maker's side a uniform maker-specific data format, which makes possible a communication with the control device independently of the respective client-specific data format. In particular, uniform bidirectional data exchange routines, so-called "data protocols" can be used in order to simplify communication with different control devices.

Further important features and advantages of the invention will be apparent from the dependent claims, from the accompanying drawings, and from the associated description of the FIGS. using the drawings.

It will be understood that the features given hereinabove and still to be explained hereinafter can be used, not only in the respectively given combination, but also in other combinations or alone, without departing from the scope of the invention.

BRIEF DESCRIPTION OF THE DRAWING

A preferred embodiment example of the invention is shown in the drawing and is further explained in the following description.

The single FIG. 1 shows a schematized block circuit diagram of a control device according to the invention.

DETAILED DESCRIPTION OF THE INVENTION

Corresponding to FIG. 1, a heating device 1 has a control device 2. The heating device 1 is for example constituted as a water or air heating device of a motor vehicle in the form of a supplementary heater or auxiliary heater, the heating device preferably being arranged for operation with liquid fuel.

The control device 2 has, preferably in a housing 3, a microprocessor 4 which communicates over corresponding leads 5 to individual components of the heating device 1, e.g., temperature sensor, glow plug, fan, fuel pump. The microprocessor furthermore communicates with memory means 6 in which device-specific data, parameter fields, and data sets are stored for the operation of the heating device 1. The control device 2 is connected via an interface 7 to a service unit 8 with which the heating device 1 can be actuated, for example by a vehicle driver.

The control device 2 furthermore has a client-specific data interface 9, which is constituted as a commercial plug connection; the individual pin connections are not shown here. The control device 2 is connected by means of the client-specific data interface 9 to a client-specific data network 10, here a data bus, particularly a CAN bus, over which numerous vehicle-side units can be connected or networked together. The data network 10 can for example be constituted in a vehicle and can network together there several devices or units, e.g., locking unit, alarm unit, air conditioning device, hi-f device, telephone device, GPS. Over the client-specific data interface 9, the data network 10, or a unit connected to it, can communicate with the control device 2 or with its microprocessor 4, a predetermined client-specific data format having to be observed. The microprocessor 4 is programmed such that it makes possible a communication over the client-specific data interface 9 with the required client-specific data format. Besides this software adaptation of the client-specific data interface 9, this is also hardware-adapted to the requirements of the client-specific data network. For example, the number and arrangement of the individual plug pin connections and the individual voltages and potentials applied to them are stated.

The control device 2 according to the invention furthermore has an additional, maker-specific data interface 11, which is constituted as a bidirectional wireless connection. This maker-specific data interface 11 is installed in the interior of the control device 2 or in the interior of the housing 3. An antenna 12 of the maker-specific data interface 11 is preferably constituted as a PCB (printed circuit board) loop antenna. The space required for this is minimal; in particular, the PCB loop antenna 12 and thus also the complete maker-specific data interface 11, together with the microprocessor 4, can be constituted on a common board.

The control device 2 can be connected to a maker-specific data processing device 13 by means of the maker-specific data interface 11, in order to carry out programming and/or testing and/or diagnosis of the control device 2 or of the heating device 1. The data processing device 13 can, for example, include a personal computer or a mobile diagnosis device. The data processing device 13 contains an interface 14 matching the maker-specific data interface 11 of the control device, in order to make the communication possible between the data processing device 13 and the control device 2.

In dependence on the wishes of the respective client, the client-specific data interface 9 has to be more or less strongly adapted to these client's wishes in the production of the control device 2. With several different clients, and also different cases of application, this leads to a large number of differently configured control devices 2 with mutually incompatible client-specific data interfaces 9. The present invention now makes possible, with several differently configured control devices 2, a uniform embodiment of the maker-specific data interface 11, so that the cost for adaptation of the maker-specific data processing devices 13 is reduced. For example, a standardized data format, particularly a standardized data protocol, can be used. Furthermore, matching of the number and arrangement of pin connections, and also their uses, is consequently dispensed with. Moreover, the accessibility of the maker-specific data interface 11 does not need to be considered.

In relation to the diagnosis possibilities, there is a special advantage of the control device 2 according to the invention, for example for heating devices 1 which are to be built into vehicles:

Basically the heating device 1 can be diagnosed over the client-specific data network 10, for which purpose a corresponding client-specific diagnosis device is required. Since each vehicle maker uses another data network 10, a workshop which is not connected to a given vehicle maker has to have in stock a suitable diagnosis device for each vehicle producer, when the diagnosis is to be carried out over the client-specific data interface 9. Since however it is possible with the control device 2 according to the invention to carry out the diagnosis (also) over the maker-specific data interface 11, a single diagnosis device 13 is sufficient for the diagnosing the heating device maker's heating device 1 in vehicles from different vehicle producers. The advantage for the respective workshop, and thus for the vehicle driver, is obvious.

An application of the invention has been described for a heating device 1, without limitation of generality, since the invention is basically usable for any device which can be networked and is to be connected into a data network.

| List of Reference Numerals | |
|---|---|
| 1 | heating device |
| 2 | control device |
| 3 | housing |
| 4 | microprocessor |
| 5 | connecting leads |
| 6 | memory means |
| 7 | interface |
| 8 | service unit |
| 9 | client-specific data interface |
| 10 | data network |
| 11 | maker-specific data interface |
| 12 | antenna |

| -continued | |
|---|---|
| List of Reference Numerals | |
| 13 | data processing device |
| 14 | interface |

What is claimed is:

1. A control device for a networkable device operated with liquid fuel, of a motor vehicle, comprising a supplementary heater or an auxiliary heater comprising a motor vehicle manufacturer-specific data interface (9) by means of which the control device (2) can be connected to a motor vehicle manufacturer-specific data network (10), in a motor vehicle, wherein the control device (2) comprises a heater-specific data interface (11) comprising a bidirectional wireless connection, by which the control device (2) can be connected to a heater-specific data processing device (13) for at least one of programming, testing and diagnosis.

2. The control device according to claim 1, wherein the heater-specific data interface (11) is within the control device (2).

3. The control device according to claim 1, wherein an antenna of the heater-specific data interface (11) comprises a printed circuit board loop antenna (12).

4. The control device according to claim 1, wherein device-specific data can be interrogated, input and changed via the heater-specific data interface (11).

5. The control device according to claim 1, wherein data which can be transmitted via the heater-specific data interface (11) for communication with the control device (2) have a heater-specific data. format, and wherein data which can be transmitted via the motor vehicle manufacturer-specific data interface (9) for communication with the control device (2) have a motor vehicle manufacturer-specific data format that differs from the heater-specific data format.

6. The control device according to claim 1, wherein the networkable device comprises an air heating device.

7. The control device according to claim 1, wherein the motor vehicle manufacturer-specific data network comprises a data bus.

8. The control device according to claim 1, wherein the networkable device comprises a water heating device.

* * * * *